US009544239B2

(12) United States Patent
Gafni et al.

(10) Patent No.: US 9,544,239 B2
(45) Date of Patent: Jan. 10, 2017

(54) METHODS AND SYSTEMS FOR NETWORK CONGESTION MANAGEMENT

(71) Applicant: Mellanox Technologies, Ltd., Yokneam (IL)

(72) Inventors: Barak Gafni, Ramat Hasharon (IL); Benny Koren, Zichron Yaakov (IL); Freddy Gabbay, Givataim (IL); Zachy Hamamaty, Hemed (IL); Shachar Raindel, Haifa (IL)

(73) Assignee: Mellanox Technologies, Ltd., Yokneam (IL)

( * ) Notice: Subject to any disclaimer, the term of this patent is extended or adjusted under 35 U.S.C. 154(b) by 172 days.

(21) Appl. No.: 13/803,144

(22) Filed: Mar. 14, 2013

(65) Prior Publication Data

US 2014/0269271 A1  Sep. 18, 2014

(51) Int. Cl.
*H04L 12/801* (2013.01)
*H04L 12/823* (2013.01)
*H04W 28/02* (2009.01)

(52) U.S. Cl.
CPC ............ *H04L 47/35* (2013.01); *H04L 47/32* (2013.01); *H04W 28/0284* (2013.01); *H04W 28/0242* (2013.01)

(58) Field of Classification Search
CPC ........ H04L 1/18; H04L 47/35; H04L 2212/00; H04L 47/11; H04L 12/4633; H04W 28/0242; H04W 28/0278; H04W 28/0284
USPC .......................................... 370/229, 230, 236
See application file for complete search history.

(56) References Cited

U.S. PATENT DOCUMENTS

| 7,486,689 B1* | 2/2009 | Mott | H04L 49/90 370/412 |
| 7,706,255 B1 | 4/2010 | Kondrat et al. | |
| 8,804,529 B2* | 8/2014 | Bergamasco | H04L 47/10 370/229 |
| 2003/0014544 A1* | 1/2003 | Pettey | H04L 29/06 709/249 |

(Continued)

FOREIGN PATENT DOCUMENTS

WO    WO 2007/121101 A2    10/2007

OTHER PUBLICATIONS

Sun Microsystems, "Making Clusters Easier with Sun Infiniband Technology," 2008 (32 pages).

*Primary Examiner* — Amy Ng
*Assistant Examiner* — Parmanand Patel
(74) *Attorney, Agent, or Firm* — Finnegan, Henderson, Farabow, Garrett & Dunner, LLP

(57) ABSTRACT

Methods and systems are disclosed for network congestion management. The methods and systems receive a first packet complying with a first network protocol comprising a first congestion indicator representative of a presence or absence of network congestion and further comprising a first set of data associated with a second network protocol, and provide an indication of the presence or absence of network congestion generated based, at least in part, on the first congestion indicator. The methods and systems also receive a first packet complying with a first network protocol comprising a first set of data associated with a second network protocol, and output a second packet complying with the first network protocol comprising a first congestion indicator representative of a presence of network congestion.

23 Claims, 11 Drawing Sheets

(56) References Cited

U.S. PATENT DOCUMENTS

| | | | |
|---|---|---|---|
| 2004/0223452 A1* | 11/2004 | Santos | H04L 47/10 370/229 |
| 2008/0025217 A1 | 1/2008 | Gusat et al. | |
| 2010/0061391 A1 | 3/2010 | Sindhu et al. | |
| 2010/0088437 A1 | 4/2010 | Zahavi | |
| 2013/0135999 A1* | 5/2013 | Bloch | H04L 47/263 370/235 |
| 2013/0322237 A1* | 12/2013 | DeCusatis | H04L 47/33 370/230 |

* cited by examiner

METHODS AND SYSTEMS FOR NETWORK CONGESTION MANAGEMENT

TECHNICAL FIELD

The present disclosure relates to the field of network congestion management and, more particularly, methods and systems for implementing network congestion management in a multi-protocol environment.

BACKGROUND

Networks are increasingly being deployed with components that utilize the InfiniBand protocol. An InfiniBand network can provide a number of benefits over a network that utilizes more traditional Ethernet and Internet protocols including, for example, a relatively higher signaling rate and a relatively lower latency. However, many network devices are not configured to utilize the InfiniBand protocol, and instead utilize Ethernet and Internet protocols. For example, a computer often will have a network interface controller ("NIC") to enable the computer to communicate using Ethernet and Internet protocols, but a computer may not have a host channel adapter ("HCA") to enable the computer to communicate using an InfiniBand protocol.

One technique for obtaining the benefits of InfiniBand in an environment with network devices that are not configured for InfiniBand is to utilize Ethernet over InfiniBand ("EoIB") or Internet Protocol over InfiniBand ("IPoIB"). With EoIB and IPoIB, a network device may send an Ethernet or IP packet that is received by another device that encapsulates the received packet into an InfiniBand packet. In other words, if using EoIB or IPoIB, the data within an Ethernet or IP packet may be placed within an InfiniBand packet. The InfiniBand packet may traverse an InfiniBand network and may also be decapsulated when exiting at appropriate points such as the InfiniBand network so that traditional Ethernet or IP network devices may read the packet. However, problems with congestion management may arise when utilizing IPoIB and EoIB.

In particular, congestion may occur at a network switch if, for example, the rate of packets passing through the switch is higher than the switch's throughput capacity. Typically, if congestion occurs at a switch, the switch will react according to the protocol of the switch. For example, a packet may be sent from a source computer to a destination computer via a number of switches. Typically, for example, if the packet complies with an Ethernet protocol and is received by router or an Ethernet switch, the router or Ethernet switch may determine that there is congestion. In response to determining that congestion is present, a router or an Ethernet switch may set a value in an Explicit Congestion Notification ("ECN") field of the packet to notify the destination computer of the congestion and/or may send a packet to the source computer in compliance with a Quantized Congestion Notification ("QCN") to notify the source computer of the congestion. The source computer and destination computer could then react and adjust to the congestion. Additionally or alternatively, a router or Ethernet switch may drop one or more packets in response to determining that congestion is present.

Similarly, if a packet sent by a source computer complies with an InfiniBand protocol and is received by an InfiniBand switch, the InfiniBand switch may determine that there is congestion. In response to determining that congestion is present, the InfiniBand switch typically may set a value in a Forward Explicit Congestion Notification ("FECN") field of the packet to notify the destination computer of the congestion and, after receiving the packet, the destination computer may send the source computer a packet with a set value in a Backward Explicit Congestion Notification ("BECN") field.

However, in a mixed-protocol environment such as EoIB and IPoIB, the traditional methods of resolving congestion may not be effective. For example, if a value in a FECN field of an IPoIB packet is set by an InfiniBand switch, the FECN field may be lost when the packet is decapsulated en route to the destination computer.

Improvements in network congestion management technology, including network congestion management technology in a multi-protocol environment, are desirable.

SUMMARY

In one disclosed embodiment, a method comprises receiving, at a first component, a first packet complying with a first network protocol, the first packet comprising a first congestion indicator representative of a presence or absence of network congestion associated with a second component configured to output packets complying with the first network protocol, the first packet further comprising a first set of data associated with a second network protocol. The method further comprises providing an indication of the presence or absence of network congestion based, at least in part, on the first congestion indicator.

In another disclosed embodiment, a method comprises receiving, at a first component, a first packet complying with a first network protocol, wherein the first packet comprises a first set of data associated with a second network protocol. The method further comprises outputting a second packet complying with the first network protocol, wherein the second packet comprises a first congestion indicator representative of a presence of network congestion associated with the first component.

In another disclosed embodiment, a method comprises receiving, at a network gateway, a first packet complying with a first network protocol, the first packet comprising a backward congestion notification representative of a presence or absence of network congestion associated with a second component configured to output packets complying with the first network protocol. The method further comprises providing an indication of the presence or absence of network congestion based, at least in part, on the backward congestion notification.

In another disclosed embodiment, a system comprises a receiver configured to receive a first packet complying with a first network protocol, the first packet comprising a first congestion indicator representative of a presence or absence of network congestion associated with a first component configured to output packets complying with the first network protocol, the first packet further comprising a first set of data associated with a second network protocol. In addition, the system comprises a transmitter configured to provide an indication of the presence or absence of network congestion based, at least in part, on the first congestion indicator.

In another disclosed embodiment, a system comprises a receiver configured to receive a first packet complying with a first network protocol, wherein the first packet comprises a first set of data associated with a second network protocol. In addition, the system comprises a transmitter configured to output a second packet complying with the first network protocol, wherein the second packet comprises a first congestion indicator representative of a presence of network congestion.

In another disclosed embodiment, a system comprises a receiver configured to receive a first packet complying with a first network protocol, the first packet comprising a backward congestion notification representative of a presence or absence of network congestion associated with a second component configured to output packets complying with the first network protocol. In addition, the system comprises a transmitter configured to provide an indication of the presence or absence of network congestion based, at least in part, on the backward congestion notification.

Additional aspects related to the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Network congestion management in a mixed-protocol environment may be implemented in a number of ways. For example, an InfiniBand switch that experiences congestion in an InfiniBand network may set a value in a FECN field of an InfiniBand packet and forward the packet to an InfiniBand gateway en route to a destination device. After receiving a packet having a set value in a FECN field, an InfiniBand gateway may attempt to resolve the congestion, using, for example, the techniques disclosed below. For example, an InfiniBand gateway may send a packet having a set value in a BECN field to another gateway from which the received packet originated. Alternatively or additionally, before, during, or after a decapsulation of an IP packet in an InfiniBand packet, an InfiniBand gateway may set a value in a ECN field of the IP packet. Such an IP packet may be received by a destination device, wherein the set value in the ECN field may cause the destination device to attempt to resolve congestion using, for example, the techniques disclosed below. Alternatively or additionally, an InfiniBand gateway may drop Ethernet or IP packets, which may provide an indication of congestion that can then be resolved by, for example, a source of data passing through the InfiniBand gateway.

Additionally or alternatively, an InfiniBand switch that experiences congestion may set a value in an ECN field of an IP packet within an InfiniBand packet. The IP packet may eventually be decapsulated and received by a destination device, wherein the set value in the ECN field may cause the destination device to attempt to resolve congestion using, for example, the techniques disclosed below. Additionally, for example, an InfiniBand switch that experiences congestion may create an additional InfiniBand packet having an encapsulated Ethernet packet with QCN data. The Ethernet packet within the additional InfiniBand packet may eventually be decapsulated and received by a source device, wherein the QCN data may cause the source device to attempt to resolve congestion using, for example, the techniques disclosed below.

Figure 1:
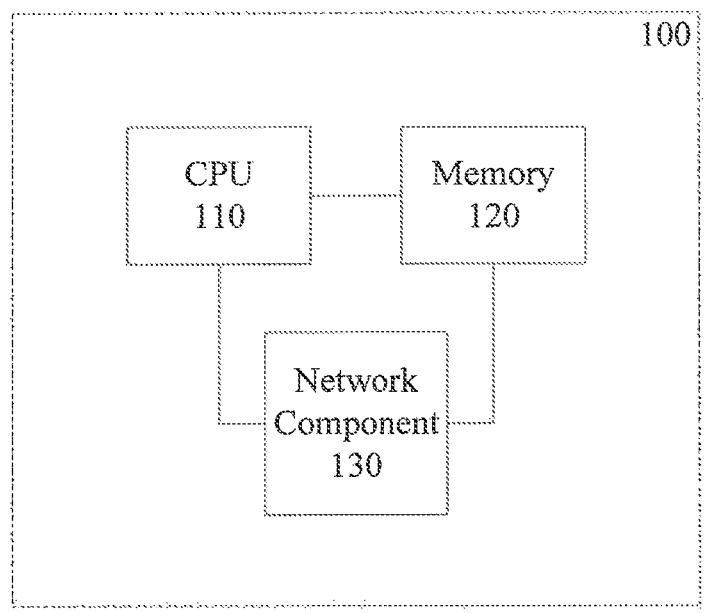
FIG. 1 illustrates an example device that may be used for implementing the disclosed embodiments.

FIG. 1 is a diagram illustrating an example device 100 that may be used for implementing the disclosed embodiments. Device 100 includes, among other things, one or more of the following components: central processing unit (CPU) 110, memory 120, and network component 130. In some embodiments, CPU 110 is configured to execute computer program code to perform various processes and methods, including the embodiments herein described. Memory 120 may comprise, for example, RAM, EEPROM, and flash memory. In some embodiments, memory 120 is configured to store data and computer program code that may be executed by CPU 110.

In some embodiments, network component 130 comprises a network interface controller ("NIC") configured for an Ethernet protocol. For example, network component 130 may be configured to send and receive Ethernet and/or IP packets. Among other things, an IP packet may include data, a source address (e.g., a MAC and/or IP address), a destination address (e.g., a MAC and/or IP address), and an Explicit Congestion Notification ("ECN") field. An ECN field may be used, for example, to provide an indication to a destination device receiving a packet comprising requested data that congestion occurred along the path of the received packet. Among other things, an Ethernet packet may include data, a source address (e.g., a MAC and/or IP address), a destination address (e.g., a MAC and/or IP address), and Quantized Congestion Notification ("QCN") data. QCN data may be used, for example, in a packet sent to a source device to provide an indication to the source device that a packet sent by the source device to a destination device encountered congestion. In some embodiments, an Ethernet and/or IP packet created by network component 130 may be encapsulated (e.g., creating an EoIB or IPoIB packet) by other components of device 100 and/or other devices.

In other embodiments, network component 130 comprises a host channel adapter ("HCA") configured for an InfiniBand protocol. In some embodiments, device 100 may implement a number of virtual NICs in software (e.g., one or more virtual NICs may be implemented by CPU 110 and memory 120), which may send and receive packets via the network component 130. For example, one or more virtual NICs of device 100 may be configured to send and receive Ethernet and/or IP packets, and network component 130 may be configured to encapsulate and decapsulate the Ethernet and/or IP packets in InfiniBand packets (e.g., creating EoIB and/or IPoIB packets). Among other things, an InfiniBand packet may include data, a source address, a destination address, a Forward Explicit Congestion Notification ("FECN") field, and a Backward Explicit Congestion Notification ("BECN") field. A FECN field may be used, for example, to provide an indication to a destination device receiving a packet comprising requested data that congestion occurred along the path of the received packet. Similarly, a BECN field may be used, for example, in a packet sent to a source device to provide an indication to the source device that a packet sent by the source device to a destination device encountered congestion. BECN and QCN are both examples of backward congestion notifications (as used herein, a backward congestion notification is a congestion notification sent to a source device and not a destination device). An IPoIB may be an InfiniBand packet in which the "data" component of the InfiniBand packet comprises the data, source address, destination address, and/or ECN field of an IP packet. An EoIB packet may be an InfiniBand packet in which the "data" component of the InfiniBand packet comprises the data, source address, destination address, and/or QCN data of an Ethernet packet.

While device 100 is depicted in FIG. 1 as including one CPU 110, one memory component 120, and one network component 130, embodiments disclosed herein may be implemented with a plurality of CPUs, a plurality of memory components, and/or a plurality of network components. For example, in some embodiments device 100 includes a network component 130 comprising a NIC and another network component 130 comprising an HCA.

Figure 2:
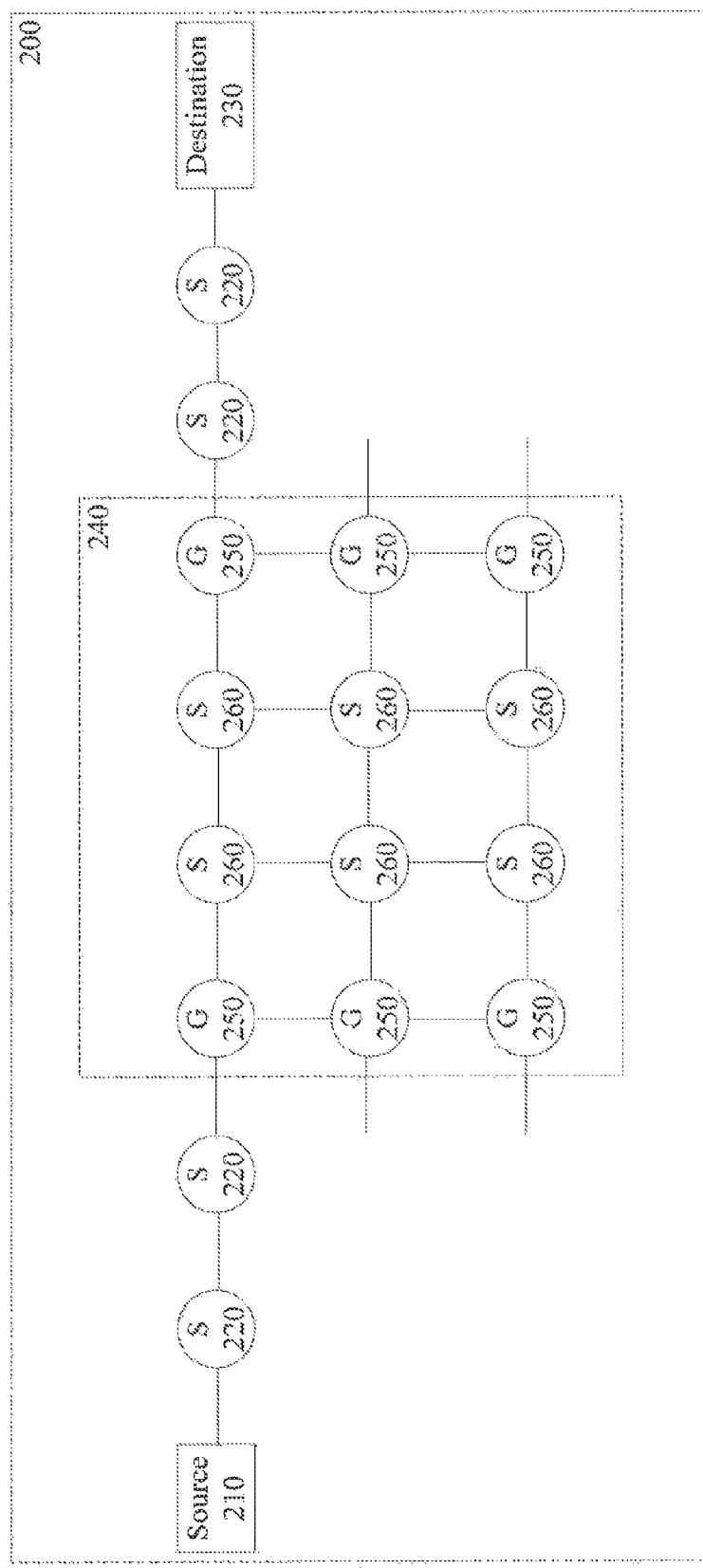
FIG. 2 illustrates an example system that may be used for implementing the disclosed embodiments.

FIG. 2 is a diagram illustrating an example system 200 that may be used for implementing the disclosed embodiments. System 200 may include, among other things, one or more of the following components: a source host 210, a number of Ethernet switches 220, a destination host 230, and an InfiniBand network 240. InfiniBand network 240 may include, among other things, one or more of the following components: a number of gateways 250 and a number of InfiniBand switches 260.

Source host 210 and destination host 230 may be configured in substantially the same manner as device 100 described above wherein the network component 130 comprises a NIC configured for an Ethernet protocol. Source host 210 may be configured to send and receive Ethernet packets utilizing its NIC. Likewise, destination host 230 may also be configured to send and receive Ethernet packets utilizing its NIC.

In some embodiments, source host 210 is connected, either directly or indirectly, to a number of Ethernet switches 220. An Ethernet switch 220 may be configured to receive Ethernet packets and route the packets toward a destination address indicated by the packet. For example, an Ethernet switch 220 may be configured to receive an Ethernet packet originating from source host 210 and route the packet toward destination host 230. Likewise, for example, an Ethernet switch 220 may be configured to receive an Ethernet packet originating from destination host 230 and route the packet toward source host 210.

In some embodiments, one or more of the Ethernet switches 220 are connected to one or more gateways 250. The one or more gateways 250 may function as ingress gateways and/or egress gateways for an InfiniBand network. For example, a gateway 250 may function as an ingress gateway by receiving an Ethernet packet from an Ethernet switch 250, encapsulating the Ethernet packet into an InfiniBand packet (e.g., creating an EoIB packet), and routing the InfiniBand packet toward the destination address indicated by the Ethernet packet. Similarly, for example, a gateway 250 may function as an egress gateway by receiving an InfiniBand packet having an encapsulated Ethernet packet, decapsulating the Ethernet packet, and routing the Ethernet packet toward the destination address indicated by the Ethernet packet. In some embodiments, the one or more gateways 250 are implemented as functions of InfiniBand switches or routers.

In addition, in some embodiments, two or more gateways 250 are connected by one or more InfiniBand switches 260. An InfiniBand switch 260 may be configured to receive an InfiniBand packet and route it toward a destination address indicated by the packet. An InfiniBand switch 260 may include a queue or buffer. A queue or buffer may prevent packets from being dropped by an InfiniBand switch 260 if packets are received faster than they can be forwarded to destinations. An InfiniBand switch 260 may be configured to detect congestion if its queue or buffer reaches or exceeds a threshold fullness. For example, an InfiniBand switch 260 may detect congestion if its queue or buffer is at least 90% full or may detect congestion if its queue or buffer is completely full.

Figure 3:
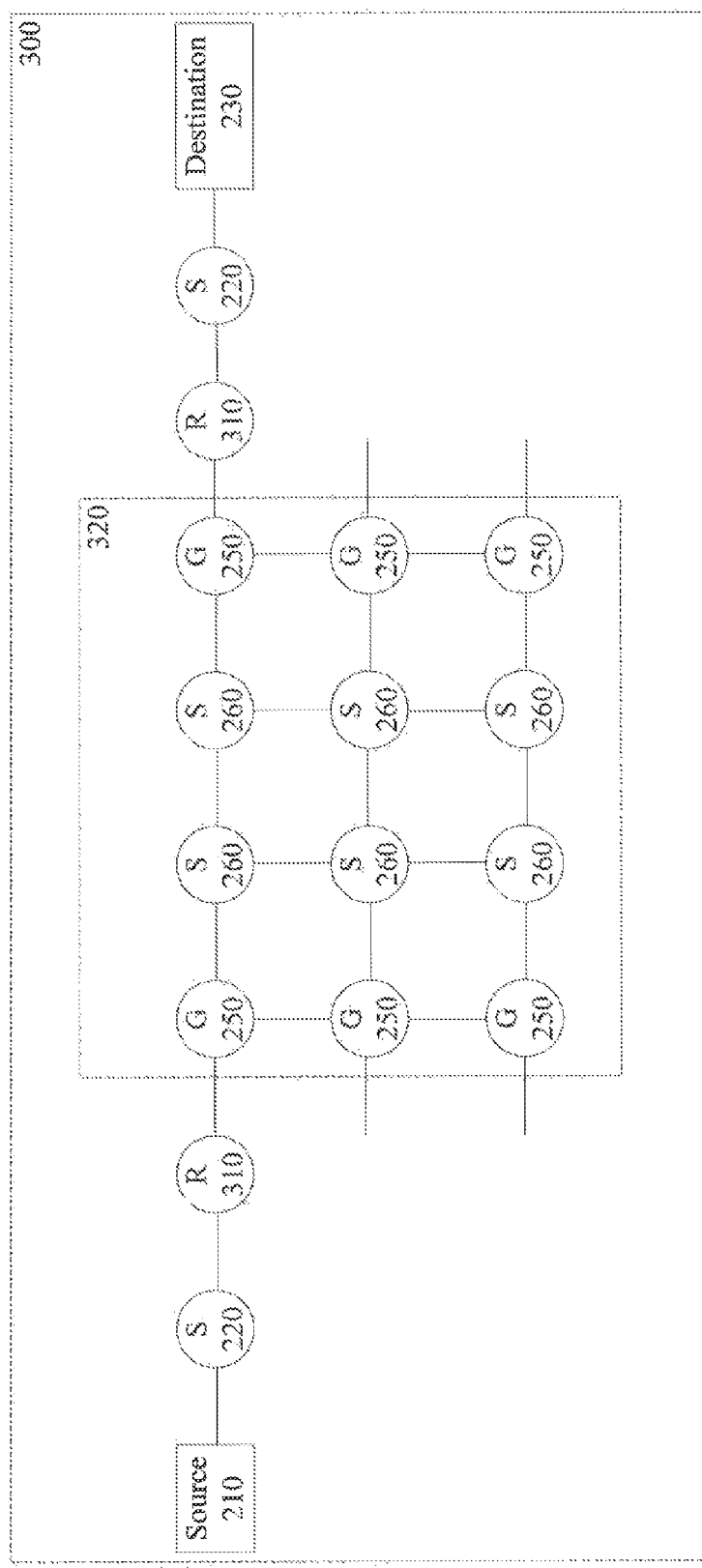
FIG. 3 illustrates an example system that may be used for implementing the disclosed embodiments.

FIG. 3 is a diagram illustrating another example system 300 that may be used for implementing the disclosed embodiments. System 300 may include, among other things, one or more of the following components: a source host 210, a number of Ethernet switches 220, a number of Ethernet IP routers 310, a destination host 230, and an InfiniBand network 320. InfiniBand network 320 may include, among other things, one or more of the following components: a number of gateways 250 and a number of InfiniBand switches 260.

Source host 210 and destination host 230 may be configured to send and receive Ethernet and/or IP packets. Moreover, source host 210 and destination host 230 may be connected, either directly or indirectly, to a number of Ethernet switches 220. Ethernet switches 220 may be connected, either directed or indirectly, to a number of Ethernet IP routers 310. Alternatively, source host 210 and destination host 230 may be connected directly to Ethernet IP routers 310. An Ethernet IP router 310 may be configured to receive an Ethernet or IP packet from source host 210, destination host 230, and/or Ethernet switch 220, and route it toward a destination address indicated by the packet.

In some embodiments, one or more of the Ethernet IP routers 310 are connected to one or more gateways 250. As described above, the one or more gateways 250 may function as ingress gateways and/or egress gateways for an InfiniBand network. In some embodiments, a gateway 250 may function as an ingress gateway by receiving an IP packet from an Ethernet IP router 310, encapsulating the IP packet into an InfiniBand packet (e.g., creating an IPoIB packet), and routing the InfiniBand packet toward the destination indicated by the IP packet. Similarly, for example, a gateway 250 may function as an egress gateway by receiving an InfiniBand packet having an encapsulated IP packet, decapsulating the IP packet, and routing the IP packet toward the destination indicated by the IP packet.

Figure 4:
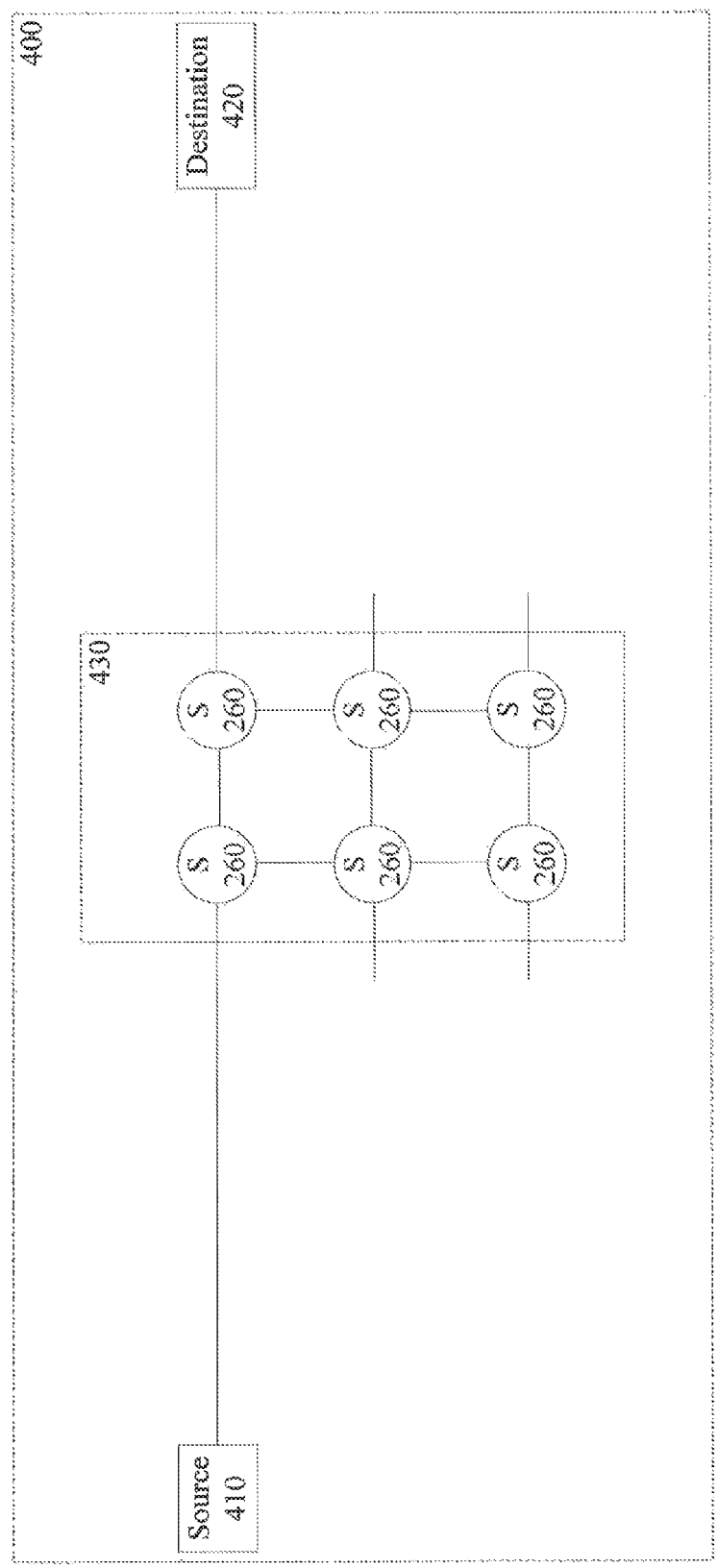
FIG. 4 illustrates an example system that may be used for implementing the disclosed embodiments.

FIG. 4 is a diagram illustrating another example system 400 that may be used for implementing the disclosed embodiments. System 400 may include, among other things, one or more of the following components: a source host 410, a destination host 420, and an InfiniBand network 430.

InfiniBand network 430 may include, among other things, one or more InfiniBand switches 260.

In system 400, source host 410 and destination host 420 may be configured in substantially the same manner as device 100 described above wherein the network component 130 comprises an HCA and wherein the device 100 also comprises one or more virtual NICs. The one or more virtual NICs of source host 410 may be configured to send and receive Ethernet and/or IP packets that may be encapsulated by an HCA into InfiniBand packets (e.g., creating EoIB and/or IPoIB packets). Likewise, destination host 420 may also be configured to send and receive EoIB and/or IPoIB packets utilizing its one or more virtual NICs and HCA. Thus, in some embodiments, InfiniBand gateways may be implemented by the HCA of source host 410 and the HCA of destination host 420. InfiniBand switches 260 may be configured to receive InfiniBand packets and route them toward a destination address indicated by the packet.

Figure 5:
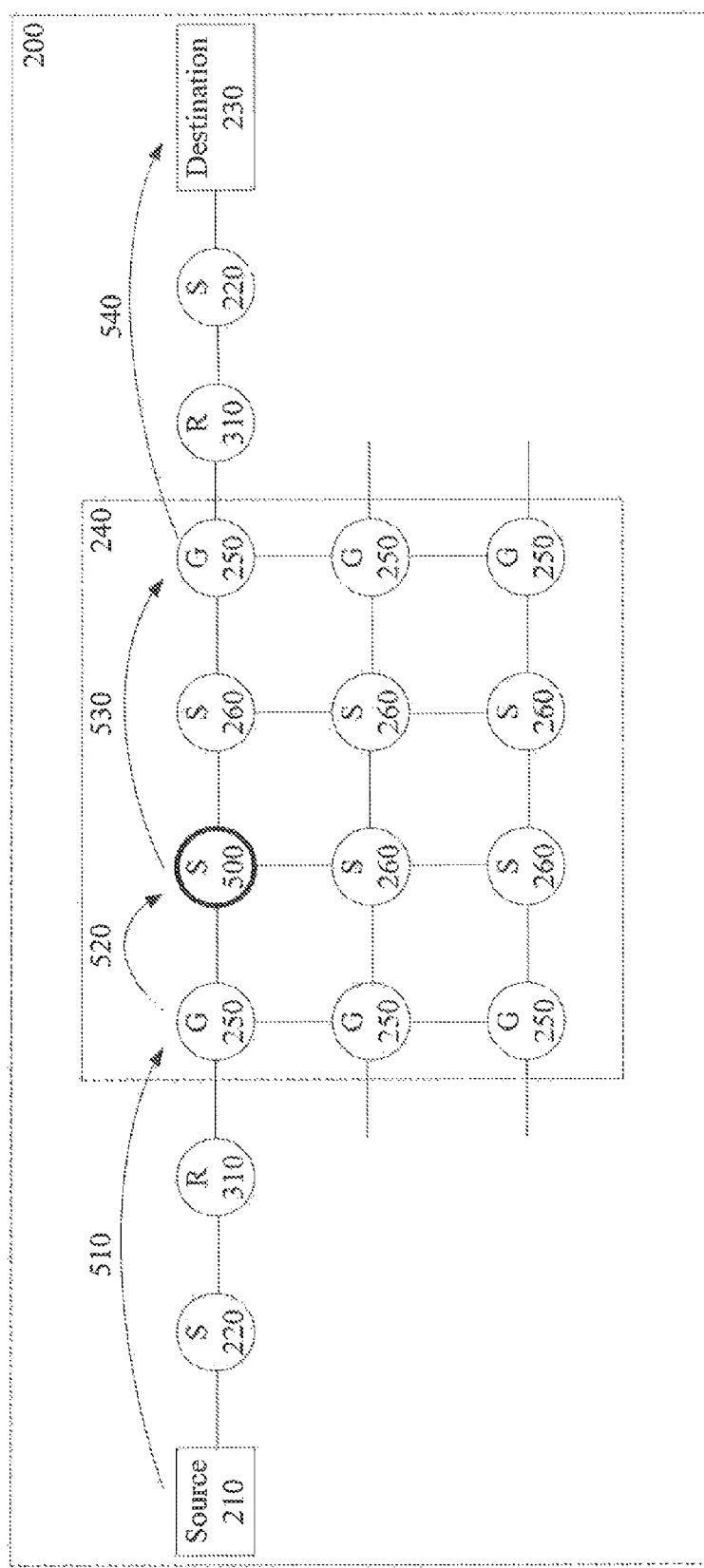
FIG. 5 illustrates an example system that encounters congestion.
Figure 8:
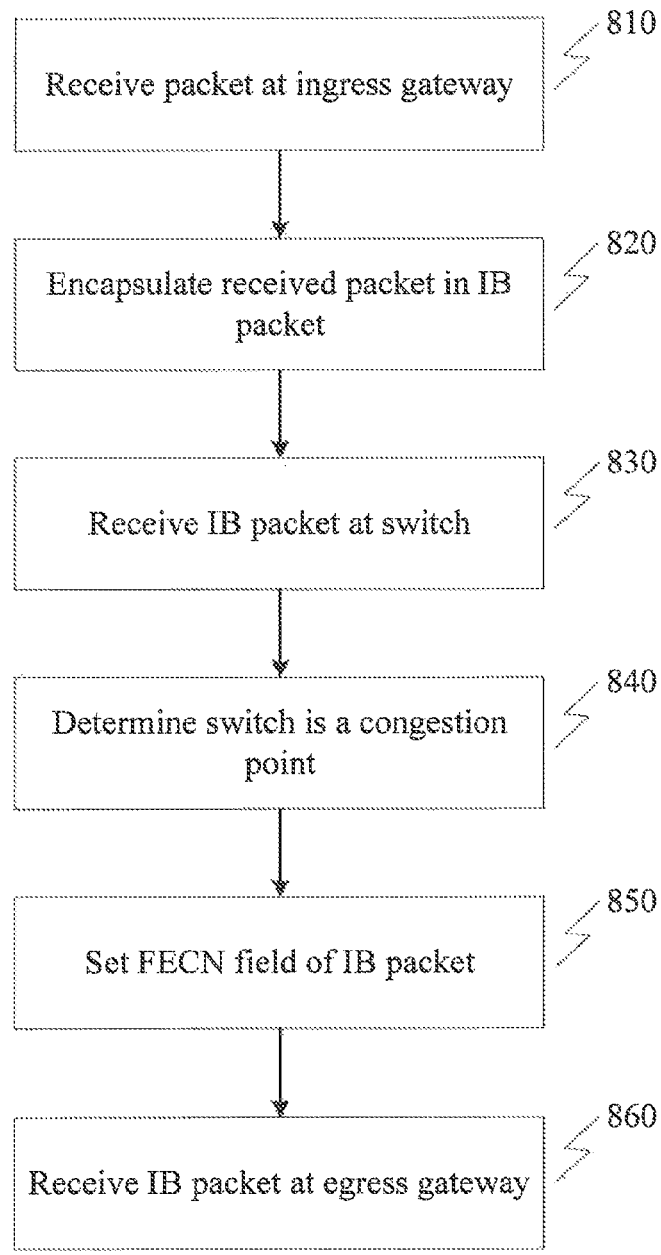
FIG. 8 illustrates an example method for detecting and responding to congestion.

FIG. 8 illustrates an example method 800 for detecting and responding to congestion. Method 800 begins with an ingress gateway receiving a packet (step 810). For example, as depicted in FIG. 5, a gateway 250 may receive an IP packet 510 transmitted by source host 210 via one or more switches 220 and/or one or more routers 310. Alternatively, for example, gateway 250 may receive an Ethernet packet transmitted by source host 210 via one or more switches 220. As another alternative, for example, an HCA of source host 410, which may include a gateway component, may receive an Ethernet or IP packet from a virtual NIC of source host 410. A source host may transmit an Ethernet or IP packet in response to a request for data from a destination host. For example, destination host may request a particular set of data from source host. The set of data requested by a destination host may require source host to send the destination host one or more Ethernet or IP packets comprising data.

In some embodiments, the ingress gateway then encapsulates the received packet into an InfiniBand packet (step 820). For example, if the ingress gateway receives an Ethernet packet, the ingress gateway may create an EoIB packet. Similarly, for example, if the ingress gateway receives an IP packet, the ingress gateway may create an IPoIB packet.

In some embodiments, the InfiniBand packet created by the ingress gateway is then received by an InfiniBand switch, either directly from the ingress gateway or via one or more other components, such as one or more other InfiniBand switches (step 830). For example, as depicted in FIG. 5, InfiniBand switch 500 may receive an InfiniBand packet 520 from gateway 250. InfiniBand switch 500 may be configured in the same or substantially the same manner as InfiniBand switch 260. In some embodiments, a determination is made that an InfiniBand switch that receives a packet is a congestion point (step 840). For example, a determination may be made that the queue or buffer of an InfiniBand switch 500 reaches or exceeds a threshold fullness. In some embodiments, in response to a determination that the InfiniBand switch is a congestion point, a value in a FECN field of a received InfiniBand packet is set (step 850). In some embodiments, the InfiniBand packet is then be received at an egress gateway (step 860). For example, as depicted in FIG. 5, an InfiniBand packet 530 having the set value in the FECN field may be sent from switch 500 and received by gateway 250. As described in more detail below with respect to FIG. 10 and FIG. 11, the FECN field may be used as an indication to resolve congestion.

Figure 9:
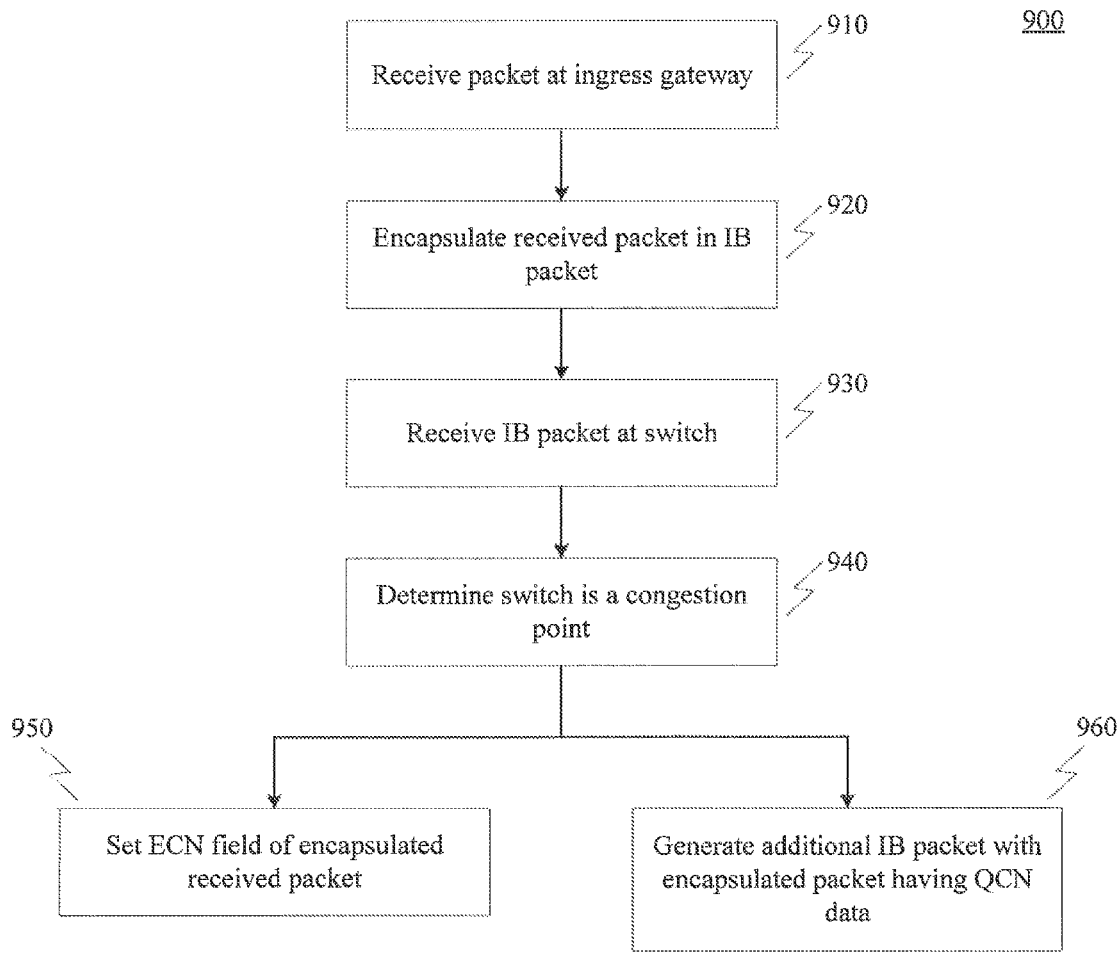
FIG. 9 illustrates an example method for detecting and responding to congestion.

FIG. 9 illustrates an example method 900 for detecting and responding to congestion. Steps 910-940 of method 900 may be performed in substantially the same manner as steps 810-840 of method 800, described above. However, in method 900, after determining that the switch is a congestion point at step 940, in some embodiments a value in the ECN field of an encapsulated received IP packet is set (step 950). After the IP packet is decapsulated and reaches the destination host, the set value in the ECN field may provide an indication to the destination host that congestion exists between the source host and the destination host and cause the destination host to slow down requests for data from the source host.

In addition, in some embodiments, after determining that the switch is a congestion point at step 940, an additional InfiniBand packet is generated having an encapsulated Ethernet packet having QCN data and sent back to the source host (step 960). For example, an InfiniBand packet having an encapsulated Ethernet packet having QCN data may be sent to gateway 250. Then, for example, the gateway 250 may decapsulate the Ethernet packet and forward the decapsulated Ethernet packet having QCN data to source host 110. After the Ethernet packet is decapsulated and reaches the destination host, the QCN data may provide an indication to the source host that congestion exists between the source host and the destination host and cause the source host to slow down transmission of data to the destination host.

In some embodiments, a combination of method 800 and method 900 may be performed if an InfiniBand switch is determined to be a congestion point. For example, in response to a determination that the InfiniBand switch is a congestion point, a value in the FECN field of the InfiniBand packet may be set, a value in the ECN field of the encapsulated received IP packet may be set, and an additional InfiniBand packet may be generated having an encapsulated Ethernet packet having QCN data.

Figure 10:
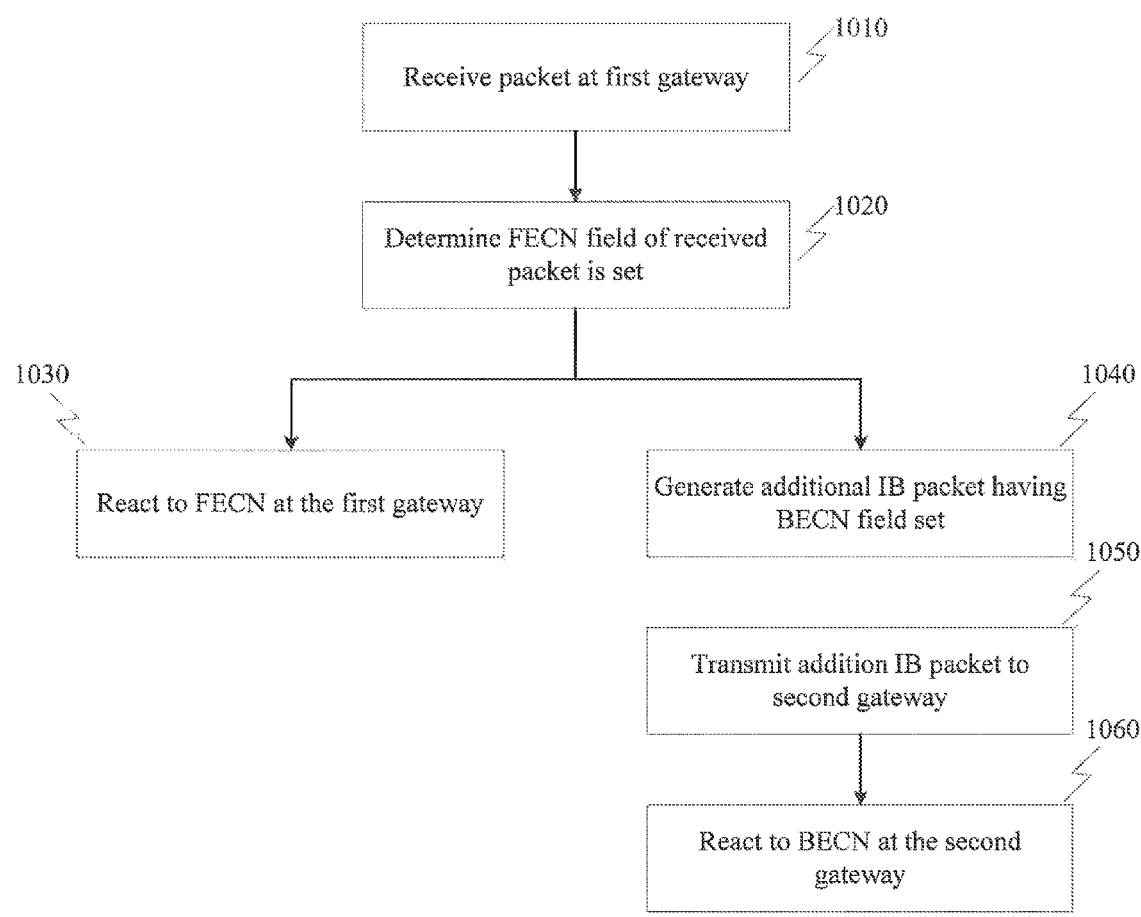
FIG. 10 illustrates an example method for detecting and responding to congestion.

FIG. 10 illustrates an example method 1000 for detecting and responding to congestion. Method 1000 begins with an InfiniBand packet received at a first gateway (step 1010). For example, as depicted in FIG. 5, InfiniBand packet 530 may be sent from congested InfiniBand switch 500 and received by a first gateway 250. In some embodiments, a determination is then made that a value in the FECN field of the received InfiniBand packet is set (step 1020). The determination that a value in the FECN field is set may indicate that the received InfiniBand packet encountered congestion at an InfiniBand switch, such as, for example, at InfiniBand switch 500. In response to the determination that a value in the FECN field is set, in some embodiments the congestion is resolved by the first gateway (step 1030). For example, the first gateway may determine that the encapsulated Ethernet or IP packet does not contain an ECN field or contains a non-settable value in the ECN field and drop the received packet. Alternatively, for example, the first gateway may resolve congestion in accordance with method 1100 depicted in FIG. 11. In some embodiments, step 1030 may be omitted.

Figure 6:
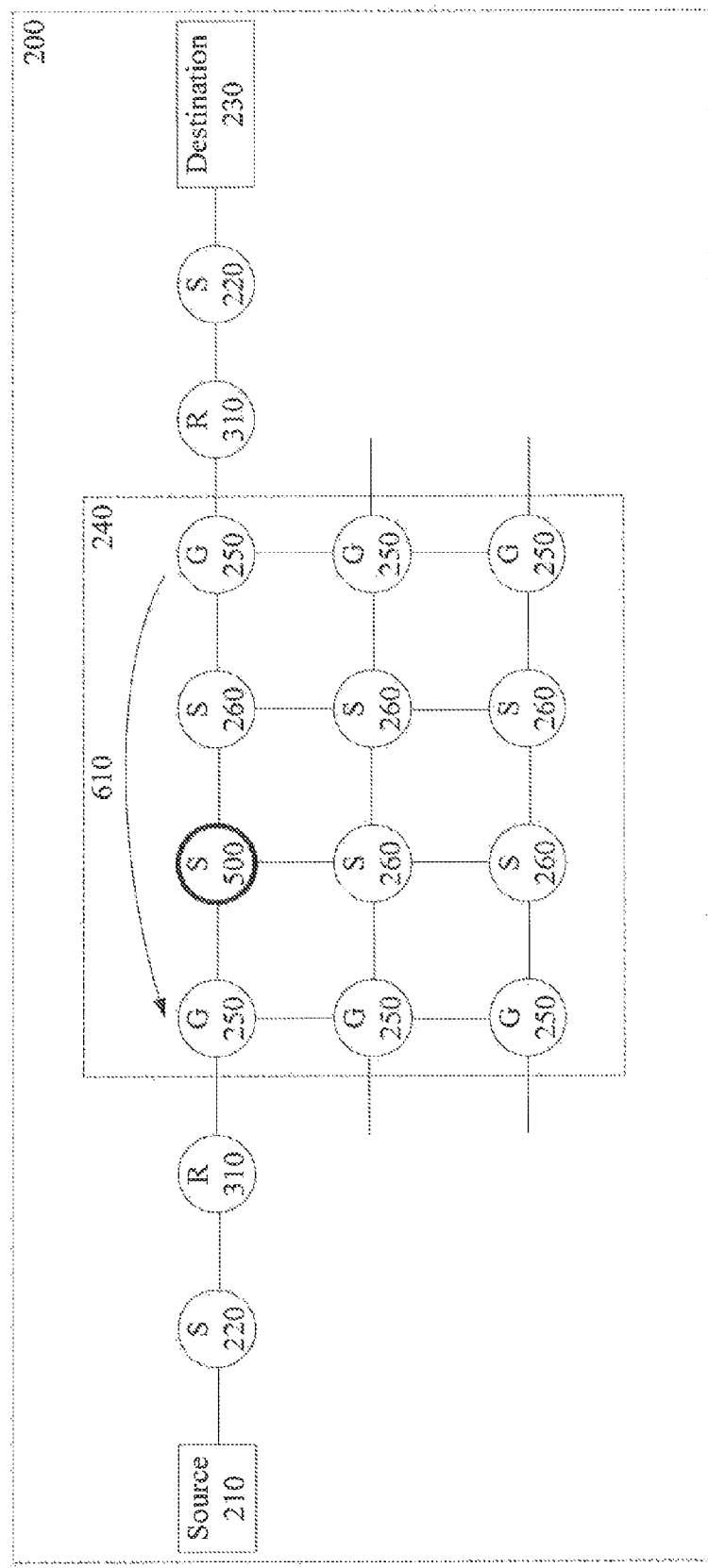
FIG. 6 illustrates an example system that encounters congestion.
Figure 7:
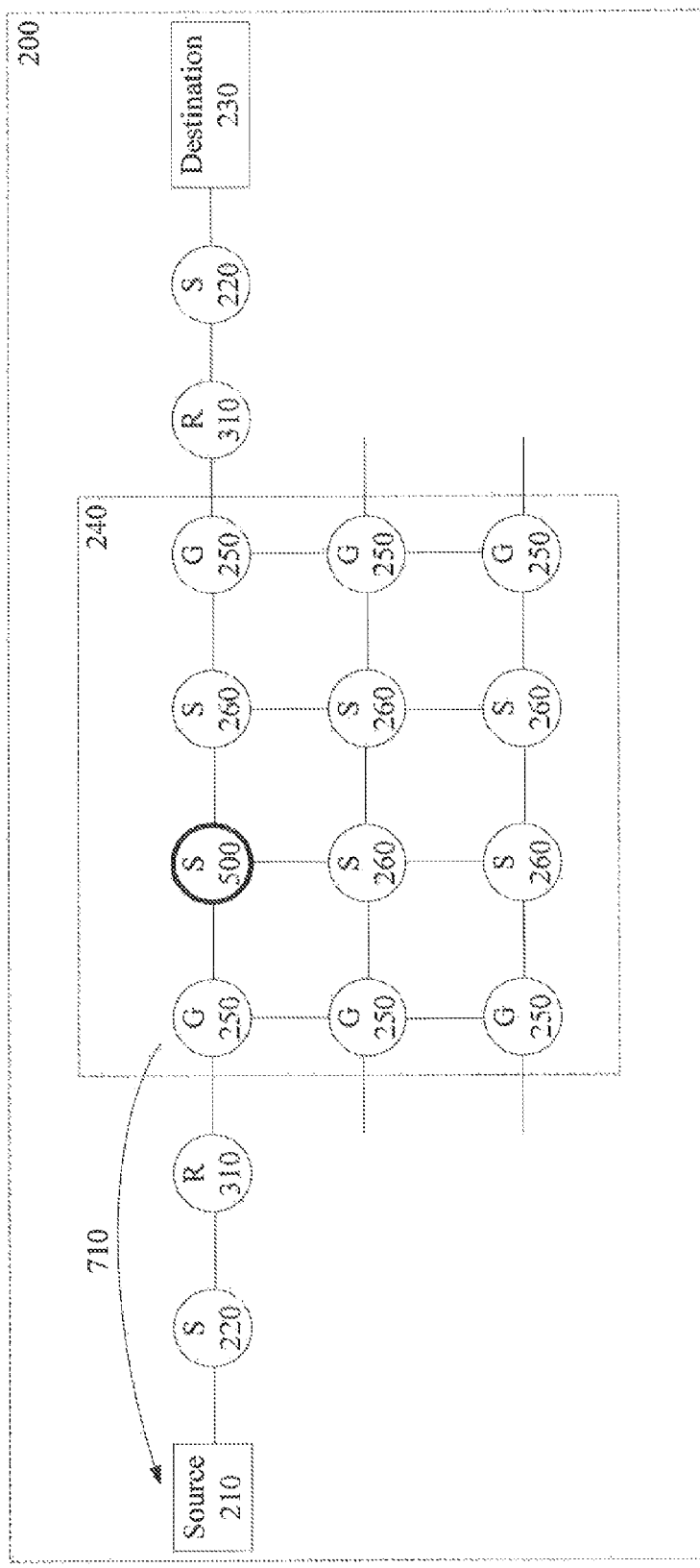
FIG. 7 illustrates an example system that encounters congestion.

In some embodiments, in response to determining a value in the FECN field of the packet received at the first gateway is set, the first gateway generates an additional InfiniBand packet having a value in its BECN field set (step 1040). In some embodiments, the additional InfiniBand packet is sent to a second gateway (step 1050). For example, as depicted in FIG. 6, an additional InfiniBand Packet 610 having a value in its BECN field set may be sent from the gateway that received an InfiniBand packet having a value in its FECN field set to the gateway that originally received the Ethernet packet 510. In some embodiments, the second gateway determines that the received packet has a value in its BECN field set and reacts to the value in the BECN field (step 1060). For example, the second gateway may act as the source of the traffic and lower the rate of packets coming from the source host to the destination host. Additionally, for example, the second gateway may resolve congestion using fine-grained traffic shaping and policing (e.g., to adjust the order of packets sent from a queue based on their destination) and/or weighted random early detection ("WRED") (e.g., to drop packets based on the size of a queue of the gateway). Additionally, for example, as depicted in FIG. 7, the second gateway (e.g., a gateway 250) may generate a TCP or IP packet 710 having a value in an ECN field set to provide the source host, such as source host 210, an indication of the congestion. In response to receiving a packet having a value in its ECN field set, the source host may reduce the rate of packets transmitted from the source host.

Figure 11:
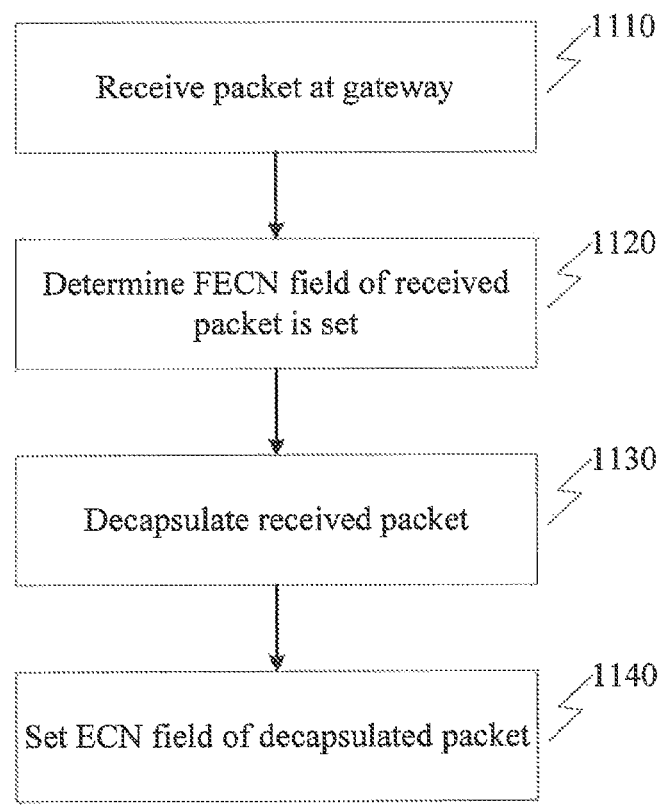
FIG. 11 illustrates an example method for detecting and responding to congestion.

FIG. 11 illustrates an example method 1100 for detecting and responding to congestion. Steps 1110 and 1120 of method 1100 may be performed in substantially the same manner as steps 1010 and 1020 of method 1000, described above. After determining that a value in the FECN field of the InfiniBand packet received at a gateway is set in step 1120, in some embodiments the Ethernet or IP packet encapsulated in the InfiniBand packet is decapsulated (step 1130). In addition, in some embodiments, prior to decapsulating an IP packet, while decapsulating an IP packet, or after decapsulating an IP packet, a value in the ECN field of the IP packet is set (step 1140). As depicted, for example, in FIG. 3, an IP packet 540 having a value in its ECN field set may be sent to the destination host 230. Based on the value in the ECN field, the destination host 230 may recognize that congestion occurred between the source host 210 and the destination host 230 and send a TCP or IP acknowledgement packet having a value in an ECN field set to provide the source host, such as source host 210, an indication of the congestion. Alternatively, for example, instead of decapsulating an Ethernet or IP packet, a gateway may determine that an encapsulated Ethernet or IP packet does not contain an ECN field or contains a non-settable value in an ECN field and drop the received packet.

In some embodiments, a combination of method 1000 and method 1100 may be performed if a value in a FECN field of a packet received at a gateway is set. For example, in response to a determination that an InfiniBand packet includes a set value in a FECN field, the gateway that received the packet may react to the FECN field as described above with respect to step 1030 of method 1000, the gateway that received the packet may send another InfiniBand packet that includes a set value in a BECN field to another gateway as described above with respect to steps 1040-1060 of method 1000, and an IP packet that includes a set value in a ECN field may be sent to the destination host as described above with respect to steps 1130-1140 of method 1100.

While embodiments have been described above describing congestion management with respect to particular protocols (e.g., InfiniBand, Ethernet, and Internet protocols), alternative embodiments may be implemented in which different protocols are used. For example, the processes and logic flows described in this specification (e.g., FIGS. 8-11) may be revised such that packets are sent from a source host and received by a destination host in a first protocol other than an Ethernet or Internet protocol and such that the packets pass through a network utilizing a second protocol other than an InfiniBand protocol. For example, the source host may send packets in a fibre channel protocol and the destination host may receive packets in the fibre channel protocol, wherein the packets pass through an InfiniBand network. Alternatively, for example, the source host may send packets in an Ethernet or Internet protocol and the destination host may receive packets in the Ethernet or Internet protocol, wherein the packets pass through a fibre channel network.

Embodiments and all of the functional operations described in this specification can be implemented in digital electronic circuitry, or in computer software, firmware, or hardware, including the structures disclosed in this specification and their structural equivalents, or in combinations of them. Embodiments can be implemented as one or more computer program products, i.e., one or more modules of computer program instructions encoded on a computer readable medium, e.g., a machine readable storage device, a machine readable storage medium, a memory device, or a machine readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, which is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification (e.g., FIGS. 8-11) can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). While disclosed processes include particular process flows, alternative flows or orders are also possible in alternative embodiments.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVDROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client/server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A method comprising:
   receiving, at a first component, a first packet complying with a first network protocol, the first packet comprising a first congestion indicator representative of a presence or absence of network congestion associated with a second component configured to output packets complying with the first network protocol, the first packet further comprising a first set of data associated with a second network protocol;
   decapsulating, based on the first network protocol, the first packet to obtain the first set of data; and
   outputting, based on the second network protocol and by the first component, a second packet complying with the second network protocol, the second packet including the first set of data and a second congestion indicator representative of the presence or absence of network congestion based, at least in part, on the first congestion indicator, wherein the second congestion indicator is different from the first congestion indicator.

2. The method of claim 1, further comprising:
   determining the second congestion indicator representative of the presence or absence of network congestion may not be set; and
   dropping the first packet based, at least in part, on the determination.

3. The method of claim 1, wherein the first network protocol is an InfiniBand protocol and the second network protocol is an Ethernet protocol or Internet protocol.

4. The method of claim 3, wherein the first congestion indicator comprises a forward explicit congestion notification and the second congestion indicator comprises an explicit congestion notification.

5. The method of claim 1, wherein the first component is an InfiniBand gateway and the second component is an InfiniBand switch.

6. The method of claim 1, wherein the first packet is an IP over InfiniBand packet, and wherein the second packet is an IP packet.

7. The method of claim 1, further comprising outputting a third packet complying with the first network protocol, the third packet including a third congestion indicator representative of the presence or absence of network congestion associated with the second component, wherein the first network protocol is an InfiniBand protocol, wherein the second network protocol is an Ethernet protocol or Internet protocol, and wherein the first congestion indicator comprises a forward explicit congestion notification and the third congestion indicator comprises a backward explicit congestion notification.

8. A method comprising:
   receiving, at a first component, a first packet complying with an InfiniBand protocol, wherein the first packet comprises a first set of data associated with an Ethernet protocol or an Internet protocol; and
   outputting, at the first component, a second packet complying with the InfiniBand protocol, wherein the second packet comprises an explicit congestion notification (ECN) or a quantized congestion notification (QCN) that is associated with the Ethernet protocol or the Internet protocol, the ECN or QCN is representative of a presence of network congestion associated with the first component.

9. The method of claim 8, wherein the first component is an InfiniBand switch, the method further comprising:
   determining the presence of network congestion associated with the first component based, at least in part, on a determination that memory associated with the first component stores more than a predetermined number of packets.

10. The method of claim 8, wherein the second packet further comprises a second set of data associated with the Ethernet protocol or the Internet protocol, wherein the second set of data comprises the ECN or QCN.

11. A method comprising:
receiving, at a network gateway, an InfiniBand packet complying with an InfiniBand protocol, the InfiniBand packet comprising a backward explicit congestion notification (BECN) representative of a presence or absence of network congestion associated with a second component; and
outputting, at the network gateway, an Ethernet packet complying with an Ethernet protocol or an Internet Protocol (IP) packet complying with an Internet protocol, the Ethernet packet or the IP packet comprising an explicit congestion notification (ECN) representative of the presence or absence of network congestion associated with the second component based, at least in part, on the BECN.

12. The method of claim 11, further comprising reducing a rate of packets passing through the network gateway.

13. A system comprising:
a receiver configured to:
receive a first packet complying with a first network protocol, the first packet comprising a first congestion indicator representative of a presence or absence of network congestion associated with a first component configured to output packets complying with the first network protocol, the first packet further comprising a first set of data associated with a second network protocol; and
decapsulate, based on the first network protocol, the first packet to obtain the first set of data; and
a transmitter configured to output, based on the second network protocol, a second packet complying with the second network protocol, the second packet including a second congestion indicator representative of the presence or absence of network congestion based, at least in part, on the first congestion indicator, wherein the second congestion indicator is different from the first congestion indicator.

14. The system of claim 13, wherein the transmitter is further configured to determine the second congestion indicator representative of the presence or absence of network congestion may not be set and drop the first packet based, at least in part, on the determination.

15. The system of claim 13, wherein the first network protocol is an InfiniBand protocol and the second network protocol is an Ethernet protocol or Internet protocol.

16. The system of claim 15, wherein the first congestion indicator comprises a forward explicit congestion notification and the second congestion indicator comprises an explicit congestion notification.

17. The system of claim 13, wherein the first packet is an IP over InfiniBand packet, and wherein the second packet is an IP packet.

18. The system of claim 13, wherein the transmitter is further configured to output a third packet complying with the first network protocol, the third packet including a third congestion indicator representative of the presence or absence of network congestion associated with the second component, wherein the first network protocol is an InfiniBand protocol, wherein the second network protocol is an Ethernet protocol or Internet protocol, and wherein the first congestion indicator comprises a forward explicit congestion notification and the third congestion indicator comprises a backward explicit congestion notification.

19. A system comprising:
a receiver configured to receive a first packet complying with an InfiniBand protocol, wherein the first packet comprises a first set of data associated with an Ethernet protocol or an Internet protocol; and
a transmitter configured to output a second packet complying with the InfiniBand protocol, wherein the second packet comprises an explicit congestion notification (ECN) or a quantized congestion notification (QCN) that is associated with the Ethernet protocol or the Internet protocol, the ECN or QCN is representative of a presence of network congestion.

20. The system of claim 19, further comprising:
a memory device; and
a processing device configured to determine the presence of network congestion based, at least in part, on a determination that the memory device stores more than a predetermined number of packets.

21. The system of claim 19, wherein the second packet further comprises a second set of data associated with the Ethernet protocol or the Internet protocol, wherein the second set of data comprises the ECN or QCN.

22. A network gateway comprising:
a receiver for receiving an InfiniBand packet complying with an InfiniBand protocol, the InfiniBand packet comprising a backward explicit congestion notification (BECN) representative of a presence or absence of network congestion associated with a second component; and
a transmitter for outputting an Ethernet packet complying with an Ethernet protocol or an Internet Protocol (IP) packet complying with an Internet protocol, the Ethernet packet or the IP packet comprising an explicit congestion notification (ECN) representative of the presence or absence of network congestion based, at least in part, on the BECN.

23. The network gateway of claim 22, wherein the transmitter reduces a rate of packets passing through the network gateway.

* * * * *